May 10, 1955  R. A. FIECHTER  2,708,070
APPARATUS FOR THE ALIGNMENT OF CURVES
Filed Sept. 27, 1951
7 Sheets-Sheet 1
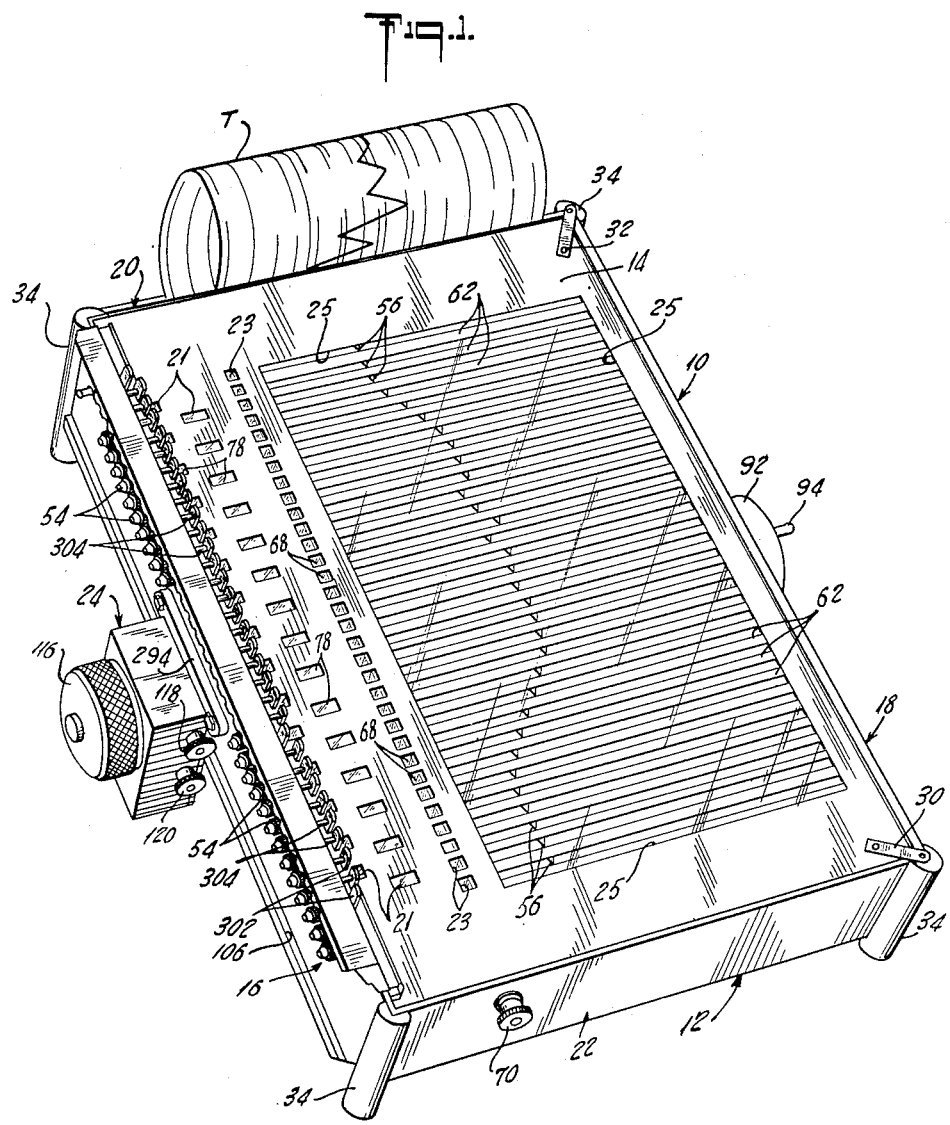
INVENTOR.
RENÉ A. FIECHTER
BY
ATTORNEYS

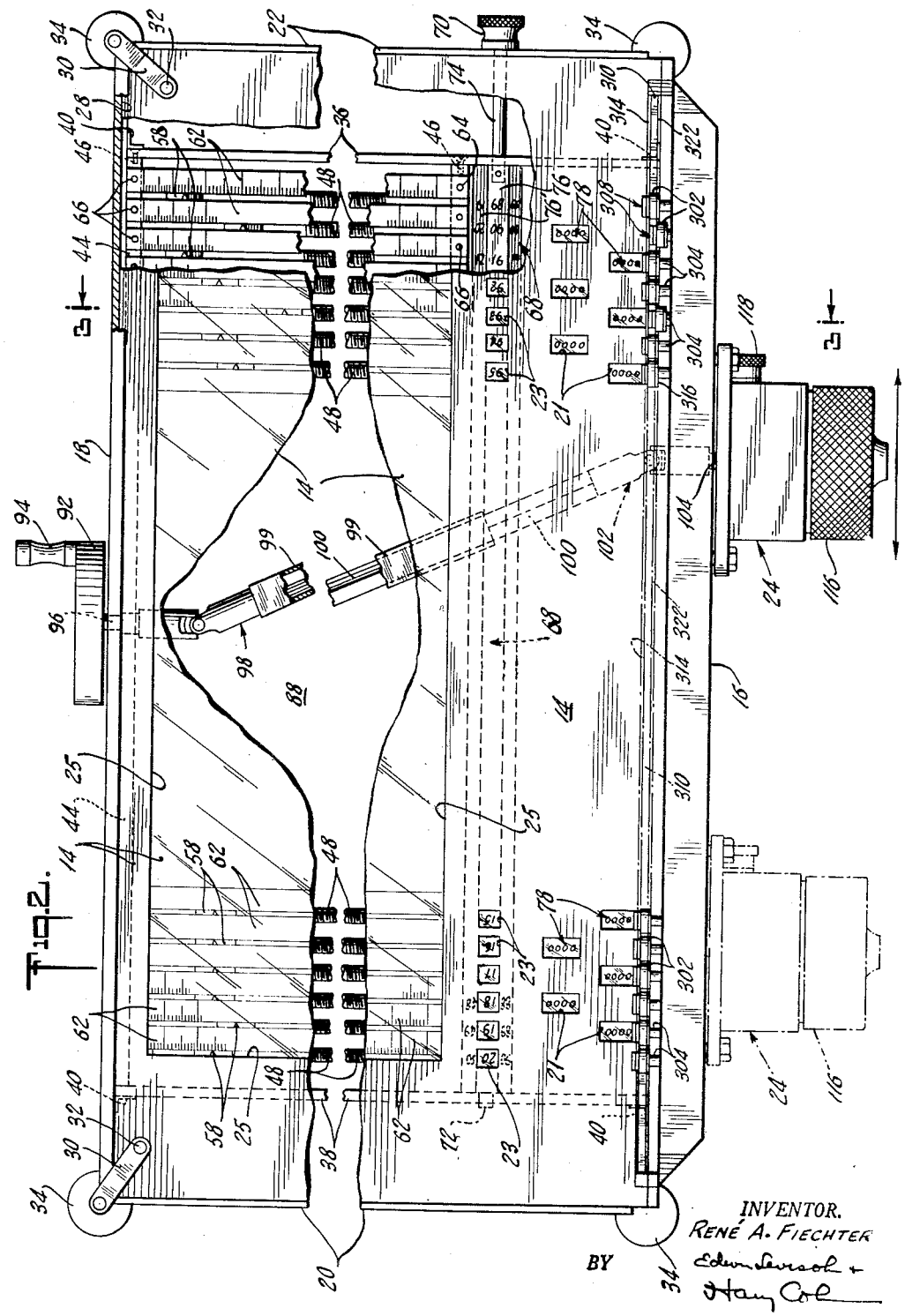

May 10, 1955
R. A. FIECHTER
2,708,070
APPARATUS FOR THE ALIGNMENT OF CURVES
Filed Sept. 27, 1951
7 Sheets-Sheet 3
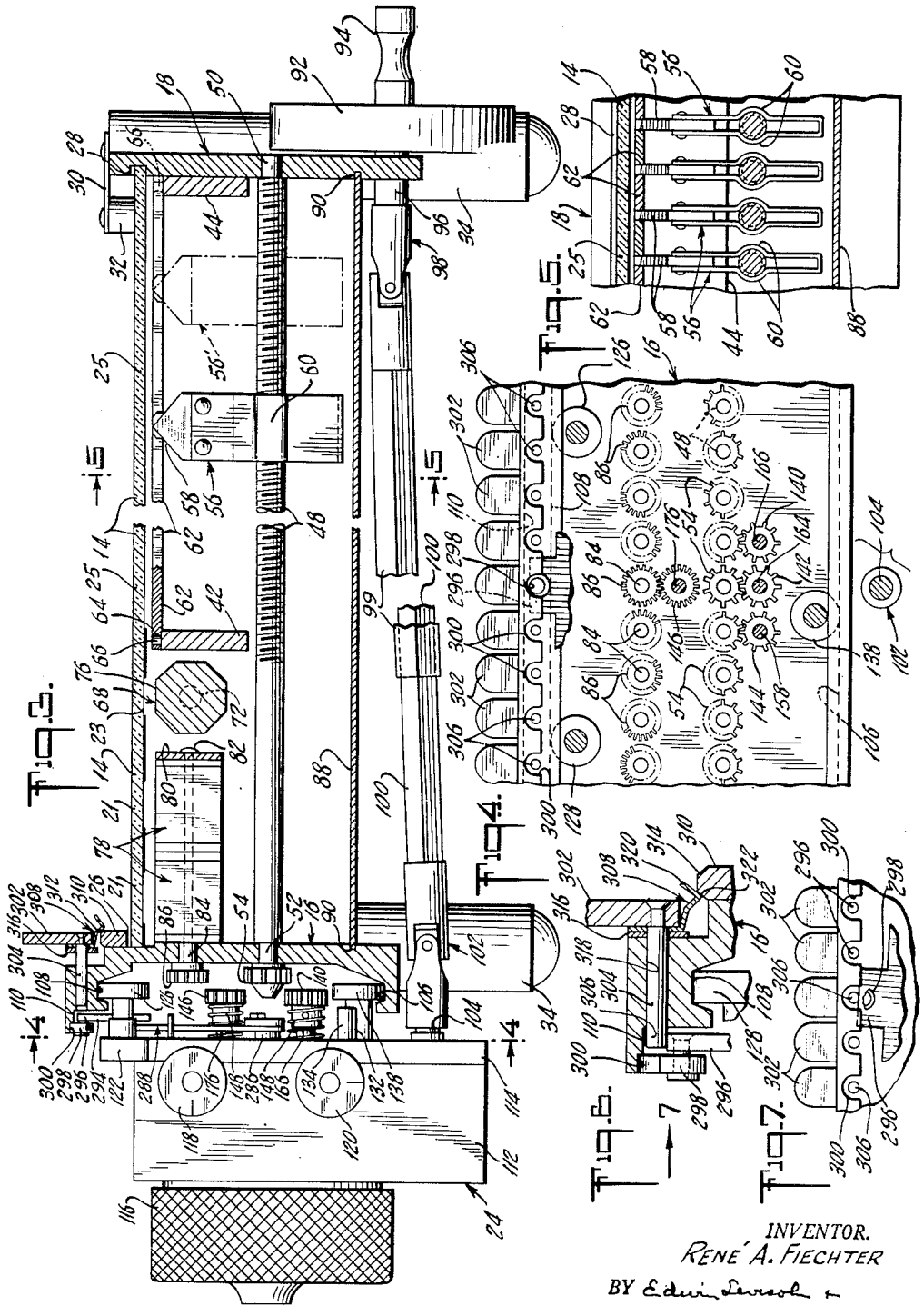
INVENTOR.
RENÉ A. FIECHTER
BY
ATTORNEYS

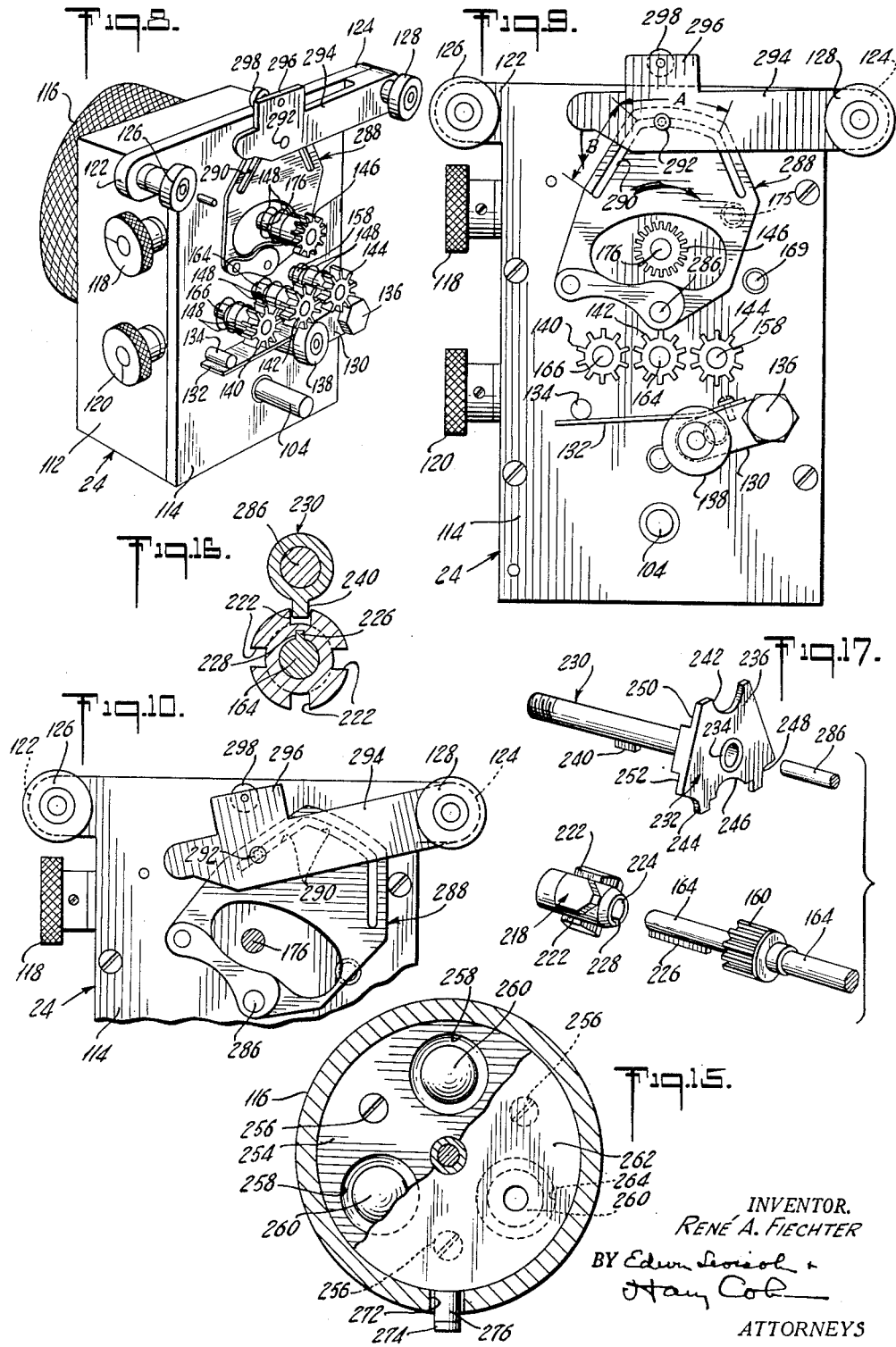

May 10, 1955  R. A. FIECHTER  2,708,070
APPARATUS FOR THE ALIGNMENT OF CURVES
Filed Sept. 27, 1951  7 Sheets-Sheet 5
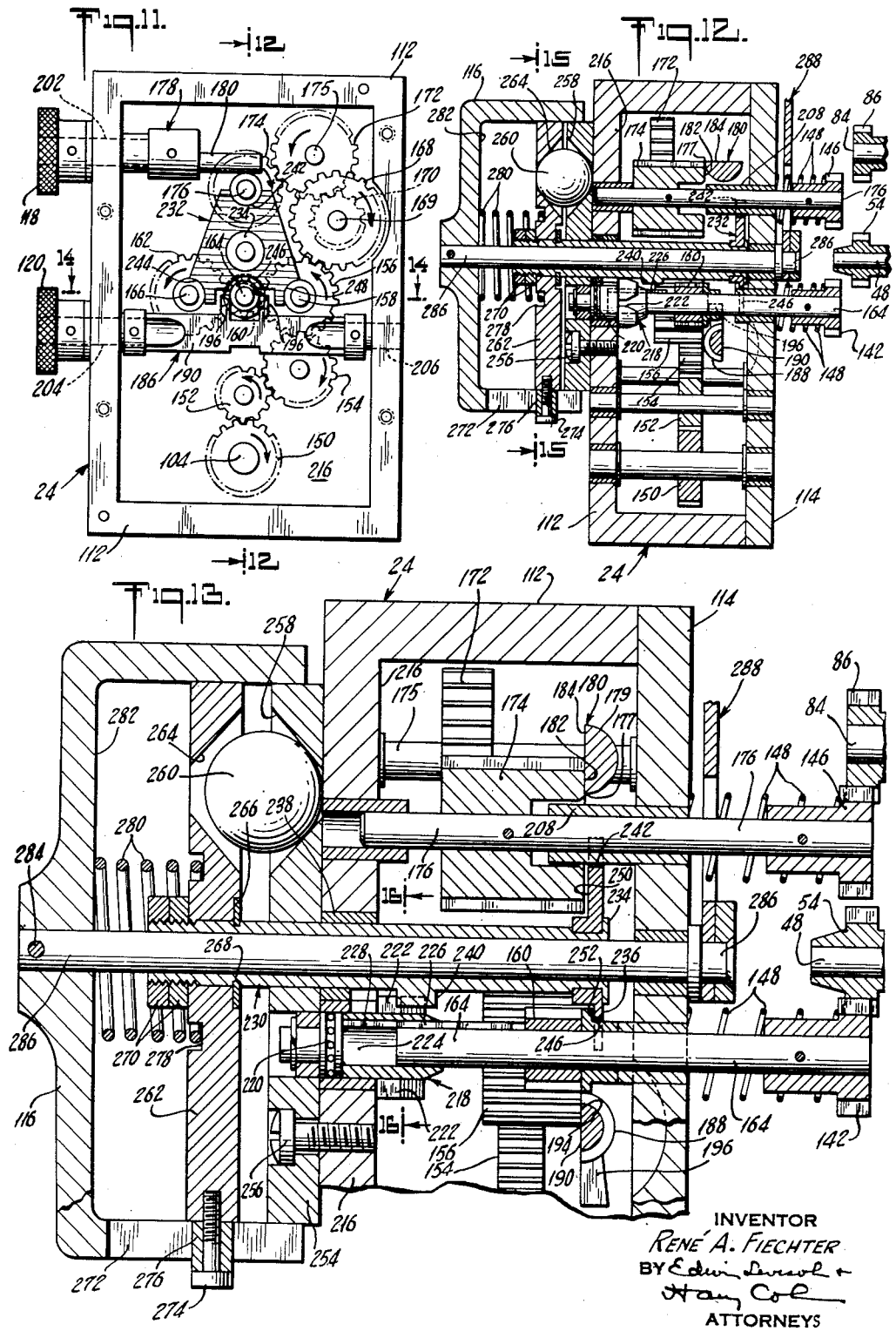
INVENTOR
RENÉ A. FIECHTER
BY Edwin Lenrol &
Harry Cole
ATTORNEYS May 10, 1955 R. A. FIECHTER 2,708,070
APPARATUS FOR THE ALIGNMENT OF CURVES
Filed Sept. 27, 1951 7 Sheets-Sheet 6

INVENTOR
RENÉ A. FIECHTER
BY
ATTORNEYS

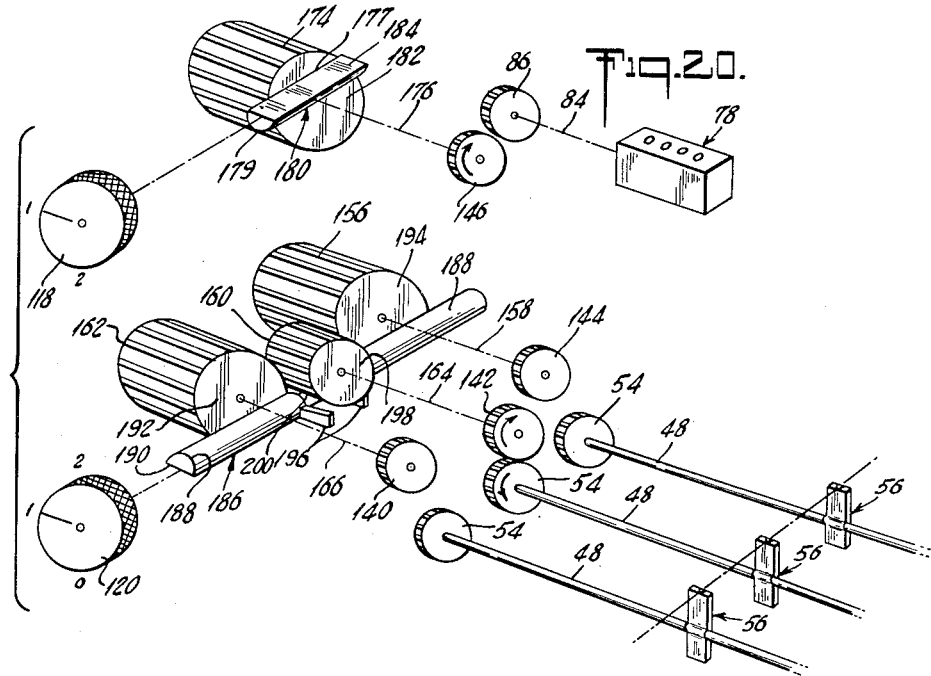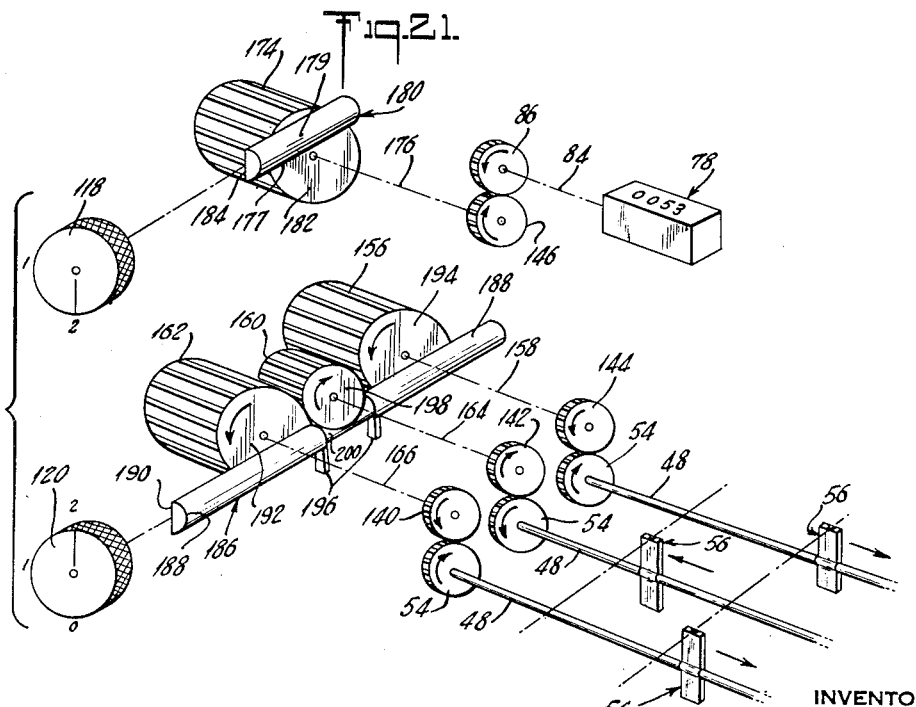

United States Patent Office 2,708,070
Patented May 10, 1955

2,708,070

APPARATUS FOR THE ALIGNMENT OF CURVES

René A. Fiechter, Jamaica, N. Y., assignor to Rene K. Price, New York, N. Y.

Application September 27, 1951, Serial No. 248,486

16 Claims. (Cl. 235—61)

This invention relates to improvements in apparatus for the alignment of curves and more particularly to improvements in apparatus for the alignment of curves on railway tracks.

High speed trains exert very great force on the track structure which is especially noticeable on curves and which is directly reflected in maintenance expense. Curves readily get out of alignment causing discomfort to passengers, and the shifting, toppling and damaging of lading, as well as increasing the danger of accidents. Restoring railway tracks to accurate alignment is therefore very important and the degree of accuracy must be higher with higher speeds. Heretofore the alignment of curves was performed by (1) the surveying method utilizing a transit, (2) the "eye" method, (3) the "string line" method, and (4) mechanical devices utilizing the "string line" principle. Methods (1) and (2) are very cumbersome, expensive and relatively inaccurate, whereas method (3) requires long and tedious calculations and skilled personnel. The method (4) devices calculate string-lining mechanically, without calculations, from measured chord heights, giving the adjusted chord heights and the corresponding displacements or throws. One such device utilizing this principle is disclosed in Patent No. 2,485,810, issued to Louis Bienfait on October 25, 1949.

Accordingly, one object of the present invention is the provision of improved apparatus for calculating string-lining mechanically.

Another object of the present invention is the provision of improved curve aligning apparatus which calculates mechanically and records the solution for the restoration of the track to proper alignment with the smallest average throw or displacement.

Another object of the present invention is the provision of improved compact and portable curve aligning apparatus which provides the solution for curve alignment problems quickly, accurately, economically and with a minimum of skill.

Another object of the present invention is the provision of improved curve aligning apparatus in which there is provision to lock the indicating pointers at stations where the physical needs prohibit throws or displacements of the railway track.

Another object of the present invention is the provision of improved curve aligning apparatus in which there is provided improved means for the setting and adjusting of the ordinates.

Another object of the present invention is the provision of improved curve aligning apparatus in which there is provided improved means for the actuation of the throw indicators.

Another object of the present invention is the provision of improved curve aligning apparatus in which there is provided improved station indicator means.

Yet another object of the present invention is the provision of improved curve aligning apparatus in which there is provided "security" means for insuring the accuracy of the mechanical string-line calculations.

The above and other objects, features and advantages of the present invention will be more fully understood from the following description considered in connection with the accompanying drawings.

In the drawings:

Fig. 1 is a perspective view of the curve aligning apparatus according to the present invention;

Fig. 2 is a plan view of the curve aligning apparatus with parts broken away;

Fig. 3 is a sectional view taken on the line 3—3 of Fig. 2;

Fig. 4 is a sectional view taken on the line 4—4 of Fig. 3;

Fig. 5 is a sectional view taken on the line 5—5 of Fig. 3;

Fig. 6 is a fragmentary sectional view on an enlarged scale of the pointer locking tab and its associated structure with the pointer locking tab being shown in the "locked" position;

Fig. 7 is a fragmentary end view of the locking tab and associated structure looking in the direction of the arrow 7 of Fig. 6;

Fig. 8 is a perspective view of the sliding gear box;

Fig. 9 is a front view of the sliding gear box;

Fig. 10 is a fragmentary front view of the upper portion of the sliding gear box with the locking element being shown in its "retracted" position;

Fig. 11 is a view similar to Fig. 9 with the cover plate and its associated parts removed;

Fig. 12 is a sectional view taken on the line 12—12 of Fig. 11;

Fig. 13 is a fragmentary sectional view on an enlarged scale of the upper portion of Fig. 12 with the operating handle being shown in its partially rotated position and the gear train locked;

Fig. 15 is a sectional view taken on the line 15—15 of Fig. 12 with parts being shown broken away;

Fig. 16 is a sectional view taken on the line 16—16 of Fig. 13;

Fig. 17 is a perspective view showing the parts of the gear train locking mechanism in dis-assembled relationship; and Figs. 18 to 21 diagrammatically illustrate the operating mechanism of the curve aligning apparatus with the control knobs of the sliding gear box in their various positions.

Figure 14:
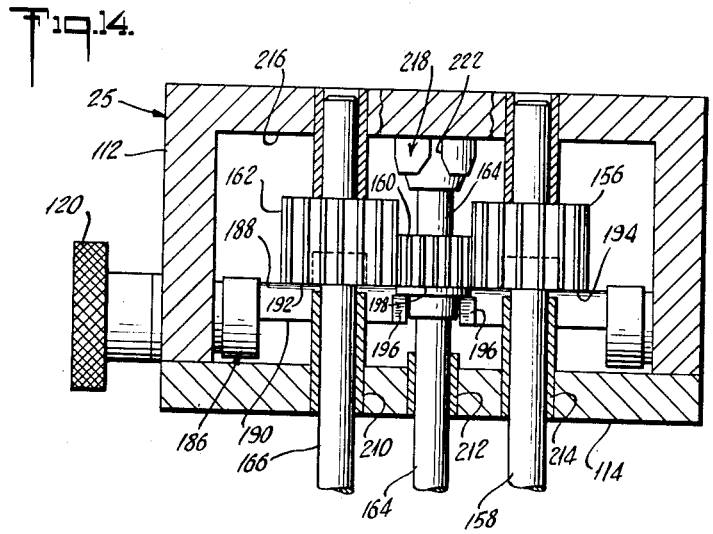
Fig. 14 is a sectional view taken on the line 14—14 of Fig. 11.

The curve aligning apparatus 10 according to the present invention is based on the geometric principle which states that by changing the length of an ordinate, by increasing or decreasing the degree of curvature at that ordinate, the length of the two adjacent ordinates will be changed by half the amount and in the opposite direction. The process of computing a curve involves changing the ordinates for the various stations as necessary, each time noting and recording the direction and amount of change and also noting and recording the opposite effect of half the value at the two adjacent stations. The process continues until all the ordinates have been adjusted to the desired value at which time there is an algebraic summation of the changes made at each station. There will result a series of net values for each station which gives the required inward or outward throw or displacement of the track at each station. The above noted basic geometric principle is fully disclosed in Patent No. 2,485,810 referred to above.

With reference to Figs. 1 and 2, the curve aligning apparatus 10 comprises a casing 12 having a top 14 of glass or any suitable transparent plastic, side plates 16 and 18 and end plates 20 and 22. Slidably mounted on the side plate 16 of the curve aligning apparatus 10 there is provided a gear box 24 which is adapted to reciprocate longitudinally of the curve aligning apparatus and which will be described in detail hereinafter. The transparent top 14 is coated at its underside with any suitable material to render said top opaque at all but the window portions 21, 23, and 25 for the various indicating devices as will be readily understood from the detailed description which follows. The side edges of top 14 are adapted to mate with the complementary slots 26 and 28 running longitudinally of the curve aligning apparatus, said slots being effective to properly position and retain the top 14 relative to said apparatus (Fig. 3). A pair of flat spring elements 30 are provided at remote corners of the device, each of said spring elements being provided with a rubber foot 32 which presses against corner portions of the top 14 and aids in securely positioning said top relative to the casing 12, as will be readily understood. At each of the four corners of the apparatus 10 there are provided legs 34 for the support of the apparatus on any suitable supporting surface. The legs 34 are each adapted to secure their adjacent side and end plates 16 and 22, respectively, together and to impart rigidity to the apparatus. A pair of spaced transverse members 36 and 38 are secured to the side plates 16 and 18 by any suitable fastening means, as by angle brackets 40. There is also provided a pair of spaced longitudinal members 42 and 44 extending between the transverse members 36 and 38, said longitudinal members being secured to said transverse members in any suitable manner, as by means of the screws 46 (see Fig. 2).

With reference to Figs. 2 and 3, there is provided a plurality of threaded rods 48, each of which has one end 50 suitably journalled in the side plate 18 and the other end 52 suitably journalled in the side plate 16. Each of the threaded rods 48 is threaded from its end 50 to a point slightly beyond the inner end of the graduated scales 62 for a purpose which will be full disclosed hereinafter. Secured to the end 52 of each of the threaded rods 48 is a spur gear 54, said spur gear being positioned adjacent to the side plate 16 on the outside thereof. There is provided one threaded rod 48 for each station of the apparatus and in the preferred embodiment 32 stations may be set and calculated at any one time. It will be readily apparent that a greater or lesser number of threaded rods 48 and stations may be provided as desired. The threaded rods 48 are positioned adjacent to each other in horizontal alignment and are disposed substantially parallel as shown in Figs. 2 and 3. Each of the threaded rods 48 is provided with a complementary threaded indicator element 56 having a pointer 58, said indicator element being adapted to be vertically positioned relative to the apparatus. As shown in Fig. 5, each of the indicator elements 56 is substantially U-shaped and has an intermediate threaded portion 60 which is adapted to mate with the threads on the threaded rod 48 so that on the rotation of each of the threaded rods 48 its associated indicator element 56 will be moved with a translatory motion parallel to its associated rod 48. It will thus be seen that the indicator elements 56 will be moved in a transverse plane by the rotation of its associated threaded rod 48, and as shown in Fig. 3, 56' designates one possible position of the indicator element 56, it being understood that each of the indicator elements 56 is adapted to be moved in any position within the range of its associated threaded rod 48. It will be readily apparent that each of the threaded rods 48 is provided with an indicator element 56 and that each indicator element may be moved independently by the rotation of its associated spur gear 54 fixed to its associated rod 48.

Disposed within the casing 12 there is provided a plurality of graduated scales 62, there being one such graduated scale associated with each indicator element 56. The scales 62 may be graduated in any desired uniform manner as will be readily understood, and each scale is provided with a pair of apertures 64 at their ends. The longitudinal members 42 and 44 are each provided with longitudinally aligned uniformly spaced cylindrical projections 66, transversely aligned pairs of projections 66 on the members 42 and 44 being adapted to mount the scales 62 at their apertures 64. Thus the cylindrical projections 66 of the longitudinal members 42 and 44 are adapted to receive the apertures 64 of the scales 62 with the scales being uniformly spaced adjacent to each other and parallelly arranged. The pointers 58 of the indicator elements 56 are adapted to be positioned between a pair of adjacent scales 62 as shown in Fig. 5, said scales being effective to restrain pointers 58 of the indicator elements 56 against movement in a longitudinal plane relative to the apparatus. Thus each of the pairs of scales 62 guides the pointer 58 positioned therebetween for transverse movement only relative to the apparatus and an additional scale 62 may be provided at one end of the series of scales 62 so that each indicator 58 may be positioned between a pair of scales 62. Thus there is provided one additional scale 62 greater than the number of pointers 58, said additional scale serving merely as a guide for one of the pointers 58 at one end of the series of scales 62. It will be readily apparent that on the rotation of each of the threaded rods 48 its associated indicator element 56 will move transversely of the apparatus and the pointer 58 will indicate a reading on its associated scale 62.

Station indicator means for each of the stations on the apparatus are provided, said means comprising an octagonal drum 68 adapted for rotation longitudinally of the apparatus by the rotation of the station knob 70 extending from the front end plate 22 of the apparatus. The octagonal drum 68 is provided with a stub shaft 72 at one end, said shaft being journalled for rotation in the transverse member 38 as shown in Fig. 2. At the other end of the octagonal drum 68 there is provided a shaft 74 which is journalled for rotation in the transverse plate 36 and the end plate 22, the station knob 70 being secured to the end of shaft 74 in any suitable manner. Each of the eight faces 76 of the octagonal drum 68 is graduated with a different series of thirty-two consecutive numbers, each of said numbers indicating a corresponding station. In the preferred embodiment, up to thirty-two stations may be mechanically calculated at one time and if it is desired to align railway track curves with more than thirty-two stations, it is only necessary to rotate the drum 68, by means of the station knob 70 thereby revealing the next adjacent face 76' through the window 23 and another series of station numbers, and make the calculations for that series of stations. This process may be repeated for the aggregate number of faces 76 comprising the drum 68. The two end stations of any series of stations on one face 76 of the drum 68, are repeated on the next adjacent face 76', and this repetition of the setting of the two end stations is to give continuity to the calculations as will be readily understood from the operation of the device which will be described below.

A revolution counter and indicator 78 is provided for each of the threaded rods 48 except the two end threaded rods, there being thirty such revolution counters 78 in the preferred embodiment of the apparatus. Each of the revolution counters 78 is in substantially axial alignment with its associated station indicator and scale 62, and the revolution counters 78 may be secured to the side plate 16 of the apparatus in any suitable manner, as by means of the longitudinal plate 80 and screws 82 which are threadingly received in the side plate 16. Each of the revolution counters 78 is provided with an operating shaft 84 (see Figs. 3 and 4) which extends through the side plate 16 and each shaft 84 is provided with a spur gear 86 secured to its end. As shown in Fig. 4, the gears 86 are uniformly spaced from each other in the same plane in a manner corresponding to the spacing of the gears 54 of the threaded rods 48. A flat plate 88 is secured to the bottom of the apparatus in any suitable manner as by means of the slots 90, in the plates 16 and 18 cooperating with the side edges of said plate 88, the plate 88 serving as the bottom part of the housing for the operating mechanism.

An operating crank 92, having a handle 94, is disposed adjacent to the side plate 18 of the apparatus on the outside thereof, said crank having a shaft 96 which is journalled for rotation in the side plate 18 of the apparatus. One end of the shaft 96 is secured to a universal joint 98, the other end of said universal joint having a hollow tube 99 which is adapted for the reception of the sliding bar 100 which is secured to a second universal joint 102. The tube 99 and the bar 100 are of complementary cross section and are adapted for relative longitudinal slidable movement. The other end of the universal joint 102 is secured to the main drive shaft 104 of the sliding gear box 24. As previously pointed out the slidable gear box 24 is adapted for movement longitudinally of the apparatus and it will be readily apparent that on such longitudinal movement there will be relative slidable movement between the tube 99 and the bar 100 whereby there will result a positive drive between the operating crank 92 and the main drive shaft 104 of the sliding gear box 24. Thus on the manual rotation of the operating crank 92 by means of the handle 94, the main drive shaft 104 of the sliding gear box 24 will be rotated and this rotation will take place for any position of the sliding gear box on the apparatus.

As pointed out above windows 21, 23, and 25 are provided through the opaque top 14 for the revolution counter indicator, station indicator and the graduations on the scales, respectively, it being understood that each scale has associated therewith a station, as indicated on the drum 68, and a revolution counter indicator. The side plate 16 of the apparatus is provided with spaced longitudinal guideways 106 and 108 which are adapted to cooperate with the complementary rollers 126, 128 and 138 secured to the sliding gear box 24 in a manner to be described in detail hereinafter. The side plate 16 of the apparatus is also provided with a longitudinal slot 110 (see Figs 3 and 6) for the reception of complementary mechanism associated with the sliding gear box, as will be described in detail below.

*Sliding gear box*

With reference to Figs. 8 and 9, the sliding gear box 24 comprises a casing 112, having a cover plate 114 secured thereto, a knurled operating handle 116, revolution counter control knob 118 and indicator control knob 120. The cover plate 114 is provided with integral ears 122 and 124, said ears being adapted to mount the rollers 126 and 128, said rollers being adapted to ride in the slot 108 in the side plate 16 of the apparatus. Pivotally secured to the cover plate 114, by means of the screw stud 136, is an arm 130 having a spring leaf 132 which is adapted to co-act with the post 134 fixed to the cover plate 114. Mounted on the arm 130 is a roller 138 which is adapted to ride in the guideway 106 in the side plate 16 of the apparatus, it being understood that when the rollers 126, 128 and 138 are positioned in their respective guideways, roller 138 will be spring biased against the bottom of its associated guideway 106 whereby the sliding gear box 24 will be free for longitudinal slidable movement relative to the apparatus but will be relatively snugly engaged to the side plate 16, spring leaf 132 engaging the side of post 134 to provide for the spring biasing of the roller 138 against the bottom of its associated guideway. Main drive shaft 104 is adapted for rotation on the manual rotation of the operating crank 92, shaft 104 being adapted to impart rotary movement to the threaded rods 48 and the revolution counter operating shaft 84 depending on the position of the sliding gear box 24 and the knobs 118 and 120.ABears 140, 142 and 144, which are adapted to be rotated by the rotation of the crank 92 through the intermediation of the main drive shaft 104, impart their rotary movement to the gears 54 which drive the threaded rods 48, when the gears 140, 142 and 144 are in mesh with gears 54. Similarly, gear 146, which is adapted for rotation on the rotation of the operating crank 92 through the intermediation of the main drive shaft 104, imparts its rotary movement to one of the revolution counter gears 86 when it is in mesh with one of said gears 86. It is to be noted that each of the gears 140, 142, 144 and 146 is biased outwardly with respect to the gear box 24 by means of the coil springs 148 surrounding their associated shafts. Gears 142 and 146 are adapted for both clockwise and counterclockwise rotation whereby the revolution counter 78 and pointer 58 with which they may be associated, may be rotated in both clockwise and counterclockwise directions. Thus gear 142 is adapted for both clockwise and counterclockwise rotation, it being noted at this point that gears 140 and 144 are adapted for rotation in a direction opposite to the direction of rotation of the gear 142. Thus when the gears 140, 142 and 144 are in mesh with a series of three adjacent rods 48, the center rod of the series of three rods will be rotated in a direction opposite to the direction of the adjacent outside rods and that the outside rods 48 will be rotated by half the amount of the rotation of the center rod 48, in accordance with the basic geometric principle on which the apparatus is based. The gears 140, 142 and 144 are adapted to be extended and retracted a predetermined distance relative to the gear box 24 by means of the indicator control knob 120, whereas the gear 146 is adapted to be extended and retracted relative to the gear box 24 by means of the revolution counter control knob 118. Gear 142 may be extended or retracted individually whereas gears 140 and 144 are adapted to be extended and retracted together and not individually. The revolution counter control knob 118 has two positions, position "1" in which the gear 146 is in the retracted position and position "2" in which the gear 146 is in the extended position. Indicator control knob 120 has three positions, position "0" in which gears 140, 142 and 144 are all retracted, position "1" in which the center gear 142 is extended, and position "2" in which the gears 140, 142, and 144 are all extended in unison a uniform distance. The means for accomplishing the above described extension and the retraction of the gears 140, 142, 144 and 146 will be described in detail hereinafter.

Figure 18:
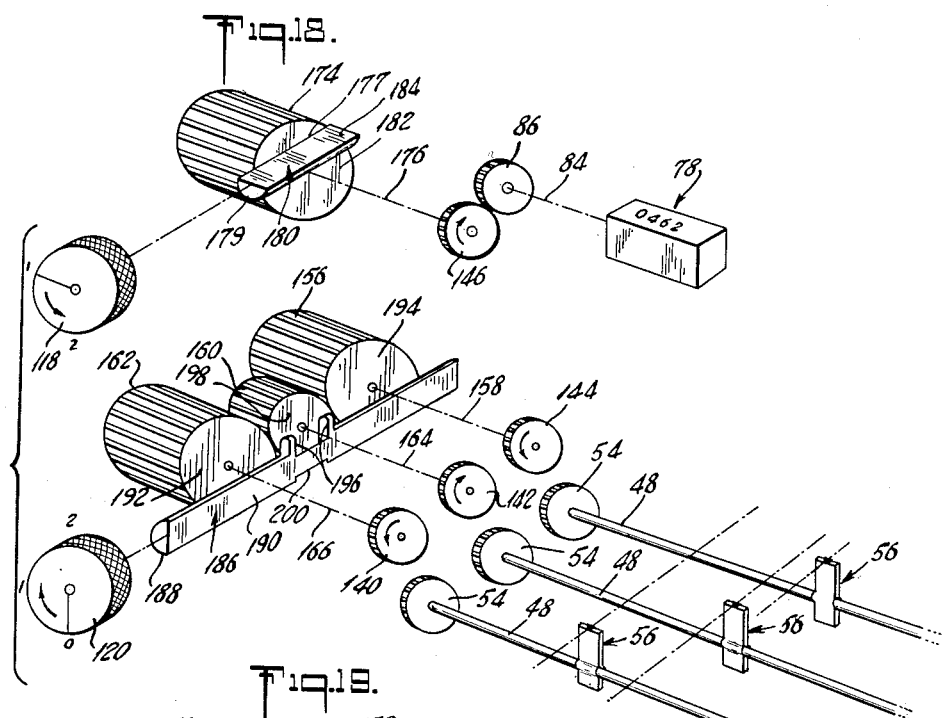

With reference to Fig. 18, it will be seen that when the revolution counter control knob 118 is in position "1" and when the indicator control knob 120 is in position "0" gears 140, 142, 144 and 146 will be out of mesh with the associated gears 54 and 86. Thus in this position of the knobs 118 and 120, the rotation of the operating crank 92 will have no effect on the indicating elements 56 and the revolution counter 78.

Figure 19:
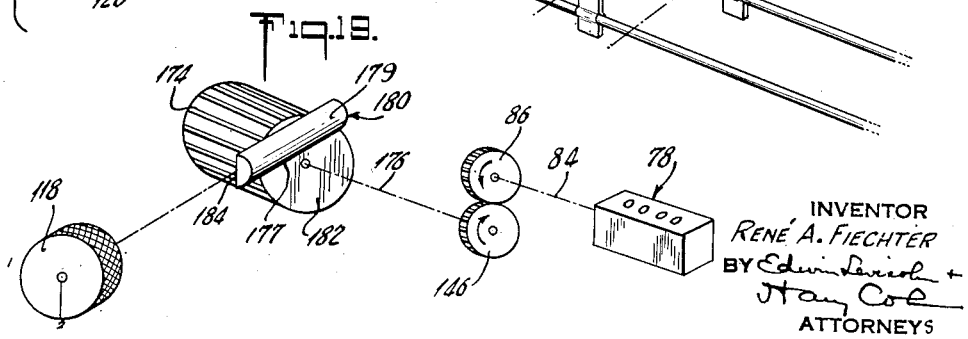

With reference to Fig. 19, the knob 118 is shown in position "2" in which the gear 146 is extended and is in mesh with the gear 86 fixed to the shaft 84 whereby on the rotation of the operating crank 92 the shaft 84 will be accordingly rotated and the rotation will be registered on the revolution counter 78. It is to be noted that in this position of the knob 118 the revolution counter 78 is adapted to be actuated in either direction.

With reference to Fig. 20, knob 118 is shown in position "1" as in Fig. 18 and knob 120 is shown in position "1" in which the center gear 142 is in its extended position and in mesh with its associated gear 54 whereby the rotation of the operating crank 92 is effective to impart rotary movement to the rod 48 associated with the center gear 142 and translatory motion to the pointer 58 of the indicating element 56. In this position of the knob 120 gears 140 and 144 are out of engagement with their associated gears 54 and therefore the rotation of the operating crank 92 will have no effect on the outside rods 48.

With reference to Fig. 21, the knob 118 is shown in position "2" as in Fig. 18 and the knob 120 is shown in position "2" in which the gears 140, 142 and 144 are all extended and in mesh with their associated gears 54. Thus with both knobs 118 and 120 in position "2," the rotation of the operating crank 92 will be effective to impart rotary movement to the series of three associated rods 48 and the associated revolution counter operating shaft 84. As previously pointed out, in this position of the control knob 120 the center indicator element 56 will be moved axially of its associated rod 48 and in an opposite direction to the outside indicator elements 56, said outside elements 56 being moved axially of their associated rods 48 by an amount equal to one-half of the movement of the center indicator element 56.

Referring to Figs. 11, 12, 13 and 14, the main drive shaft 104 is provided with a spur gear 150 secured thereto which drives the gear 152, gear 152 in turn driving gear 154 which is in mesh with the gear 156. Gears 152 and 154 are idler gears which impart their rotary motion to gear 156, which is secured to the shaft 158 which drives the gear 144. Gear 156 is in mesh with gear 160, gear 160 driving the gear 162. Gear 160 is secured to the shaft 164 which carries the gear 142 whereas gear 162 is secured to shaft 166 which carries the gear 140, it being understood that the rotation of the main drive shaft 104 is effective to impart rotary motion to the gears 156, 160 and 162 which in turn impart their rotary motion to gears 144, 142 and 140, respectively. Gears 156 and 162 have twice the number of teeth as gear 160 whereby for each revolution of the gears 156 and 162 gear 160 is given two revolutions so that the gear 142 which is fixed to the shaft 164 is revolved two revolutions for each revolution of the gears 140 and 144 in accordance with the basic geometric principle of operation of the apparatus. Gear 156 is in mesh with the idler gear 168, said gear 168 having coaxially mounted therewith and secured to the same shaft 169, gear 170, which is in turn in mesh with the idler gear 172 secured to the shaft 175. Gear 172 is in mesh with gear 174, said gear being fixed to shaft 176 which has secured thereto gear 146 which is adapted to mesh with the gears 86 which actuate the revolution counters 78. The gears positioned internally of the sliding gear box 24 are so designed as to indicate one unit on the revolution counter 78 for each unit of movement of the pointer 58 when the sliding gear box 24 is so positioned that the center gear 142 is directly operatively associated with the station under consideration. Thus when the sliding gear box 24 is positioned at a particular station with the center gear 142 being in mesh with its associated gear 54 and with the gear 146 in its extended position, one unit of movement of the pointer 58 associated with the center rod 48 as shown on the scale 62 will accordingly move the indicator in the associated revolution counter 78 one unit.

In order to provide for the extension and retraction of the gear 174 there is provided a rotatable arm 178 having a control knob 118 secured to one end and having its other end 180 semi-cylindrical in contour (see Figs. 11 and 13). The semi-cylindrical portion 180 is adapted to co-act with the face 182 of the gear 174, and when the control knob 118 is rotated to position "1," one edge 177 of the semi-circular periphery 179 of the portion 180 moves the gear 174 axially inwardly of the gear box 24 against the action of the coil spring 148 associated with the shaft 176 (see Figs. 18 and 19). On the rotation of the control knob 118 to position "2" the shaft 176 and gear 174 will be moved outwardly of the gear box 24 in an axial direction by the action of the coil spring 148, the face 182 of the gear 174 being spring biased against the flat face 184 of the portion 180 of the arm 178.

In order to provide for the extension and retraction of the gears 140, 142 and 144, there is provided a rotatable arm 186 having a control knob 120 secured to one (see Figs. 18, 20 and 21). Arm 186 is provided with a semi-circular peripheral portion 188 and a flat face 190 so that when the knob 120 is rotated to the "0" position as shown in Fig. 18, the semi-circular peripheral portion 188 will co-act with the outer faces 192 and 194 of the gears 162 and 156, respectively, to retract said gears against the action of their associated coil springs 148. Similarly, when the control knob 120 is rotated to position "2" as shown in Fig. 21, the gears 162 and 156 will be moved into the extended position by the action of their associated springs 148 with the faces 192 and 194, respectively, of said gears abutting the adjacent portions of the flat face 190 of the arm 186. Integral with the arm 186 there is provided a pair of spaced projections 196 which are adapted to control the extension and retration of the center gear 160. As shown in Fig. 18, when the indicator control knob 120 is in the "0" position, the spaced projections 196 are operative to retract the gear 160, said spaced projections bearing against the face 198 of the gear 160. When the indicator control knob 120 is rotated to position "1" and position "2," the arm 186 will be accordingly rotated in a clockwise direction as indicated by the arrow on the knob 120 in Fig. 18 and accordingly the spaced projections 196 will be rotated to the positions indicated in Figs. 20 and 21 in which said spaced projections are clear of the axial path of movement of the gear 160. Thus in positions "1" and "2" of the control knob 120, as shown in Figs. 20 and 21, the center gear 160 will be in its extended position, it being noted that the spring 148 associated with the shaft 164 is arranged to bias the gear 160 into its extended position. The arm 186 is undercut at its central portion as indicated at 200 in Figs. 20 and 21, to provide the necessary clearance for the extension of the gear 160 when the control knob 120 is in positions "1" and "2." The arm 178 is journalled for rotation in the casing 112 at 202 and the arm 186 is journalled for rotation in the casing 112 at 204 and 206, it being understood that the arms 178 and 186 are axially aligned in a vertical plane and are substantially parallel to each other.

With reference to Fig. 12, it will be noted that cover plate 114 has secured thereto a projecting bearing 208 which is adapted for the reception of the shaft 176 of the revolution counter gear train, and with reference to Fig. 14 it will be seen that the cover plate 114 has also secured thereto three aligned projecting bearings 210, 212 and 214 which are adapted for the reception of the shafts 166, 164 and 158, respectively, in the indicator element gear train. The above described bearings 208, 210, 212 and 214 are projected into the interior of the gear box 24 for a purpose to be described in detail hereinafter, it being however noted that the center bearing 212 projects for a much smaller distance with respect to the cover plate 114 than the other projecting bearings above described. Rotatably mounted with respect to the rear wall 216 of the casing 112 is a star wheel 218 having a bearing race 220, said star wheel being in axial alignment with the shaft 164 of the center gear 160 (see Figs. 13 and 17). The star wheel 218 is provided with spaced peripheral slots 222 and is apertured at 224 for the reception of one end portion of the shaft 164 of the center gear 160. With reference to Fig. 17, it will be seen that shaft 164 is provided with a longitudinal key 226 which is adapted to be received in the longitudinal key-way 228 of the star wheel 218. Thus when the star wheel 218 and the shaft 164 are in assembled relationship as shown in Figs. 12 and 13, the shaft 164 and concomitantly the gear 160 are free for axial movement relative to the star wheel 218 but are locked against relative rotation to the star wheel 218. Thus the star wheel 218 and the shaft 164 are locked against relative rotation but the shaft 164 is nevertheless free for axial movement relative to the star wheel 218 so that the gear 160 may be extended and retracted as aforedescribed in detail above. It will therefore be observed that when the star wheel 218 is locked against rotation, the gear 160 and consequently the remainder of the gears in the casing 112 and the associated gear train will be locked against rotation.

With reference to Figs. 12, 13 and 17, there is provided a tubular element 230 having a plate 232 secured thereto in any suitable manner, as by means of upsetting the end 234 of the tube 230 over the outer face 236 of the plate 232. As shown in Fig. 13, the tubular element 230 projects through and is supported by the bearing 238 in the rear wall 216 of the casing 112. The tubular element 230 is adapted to be moved axially of the casing 112 of the sliding gear box 24 but is locked against rotation with respect to said casing by means to be described in detail below. It will be noted that the tubular element 230 is provided with a locking element 240 integral therewith, said locking element being adapted to cooperate with one of the slots 222 of the star wheel 218. In Fig. 12 it will be seen that the locking element 240 is out of engagement with the slots 222 of the star wheel 218 whereas in Fig. 13 the locking element 240 is shown partially engaged in one of the slots 222 of the star wheel thereby locking said star wheel, it being noted that on the locking of the star wheel 218 against rotation all the gears in the sliding gear box 24 will be accordingly locked against rotation. The tubular member 230 is locked against rotation in a manner to be described below and therefore when said tubular member is axially moved from the position shown in Fig. 12 to the position shown in Fig. 13 in which it engages one of the slots 222 of the star wheel 218, said star wheel will be locked against rotation thereby locking all the gears in the gear box 24 against rotation and accordingly locking the gears 140, 142, 144 and 146 against rotation. The axial movement of the tubular element 230 is under the control of the operating handle 116 in a manner to be described below said tubular element is locked against rotation by means of the plate 232 which co-acts with peripheral portions of the projecting bearings 208, 210, 212, and 214 above described. With respect to Fig. 17, the plate 232 is provided with an upper cut-away portion 242 which co-acts with the projecting bearing 208 as shown in Fig. 13, whereas the lower portion of the plate 232 is provided with cutaway portions 244, 246 and 248 which co-act with the projecting bearings 210, 212 and 214, respectively. Thus the plate 232 and concomitantly the tubular element 230 will be locked against rotation for the full range of axial movement of said tubular element by means of the projecting bearings 208, 210, 212 and 214 co-acting with their associated cut-away portions in the plate 232. It will also be seen that when the plate 232 is moved axially inward with respect to the gear box 24 by means of the operating handle 116, any of the gears 156, 160, 162 and 174 that are in the extended position will be retracted but will be returned to their initial position on the return of the operating handle 116 to its relaxed position. Thus the rear face portion 250 of the plate 232 controls the axial position of the gear 174, the rear face portion 252 controls the axial position of the gear 162, and similar rear face portions of the plate 232 control the axial position of the gears 160 and 156, the axial position of the plate 232 being under the control of the operating handle 116. It will be seen from the above therefore that whenever the tubular element 230 is axially moved inwardly under the control of the operating handle 116, any of the gears 140, 142, 144 and 146 that may be in the extended position are accordingly retracted until the control handle 116 is returned to its relaxed position. It will therefore be observed that whenever the tubular element 230 is axially moved inwardly with respect to gear box 24, the locking element 240 will engage one of the slots 222 in the star wheel 218 thereby locking the entire gear train and at the same time retracting any of the gears 140, 142, 144 and 146 that may be in the extended position (see Fig. 16). Thus the tubular element 230 and its associated plate 232, and the star wheel 218 in association with the shaft 164 having the key 226 constitute a "security" device which is effective to lock all the gears in the gear train against rotation on the axial inward movement of the tubular element 230 which is under the control of the operating handle 116.

With reference to Figs. 12 and 13, a circular plate 254 is secured to the rear of the casing 112 in any suitable manner as by means of the screws 256. The plate 254 is provided with a plurality of spherical depressions 258 and in the preferred embodiment three such depressions equi-distantly spaced from the axis of the plate 254 are utilized. Each of the depressions 258 are adapted for the reception of a portion of a ball bearing 260. Secured to the tubular element 230 in axially spaced position from the plate 254 is an actuating plate 262 provided with a plurality of depressions 264 equi-distant and uniformly spaced with respect to the axis of the actuating plate 262. The actuating plate 262 is secured to the tubular element 230 by means of the C-washer 266 positioned in the peripheral groove 268 at one side of the plate 262, and by means of the pair of nuts 270 threaded on one end of the tubular element 230 at the other side of the plate 262. It will be seen that on the rotation of the plate 262 relative to the plate 254 and the casing 112, the plate 262 will ride up on the ball bearings 260 and will be axially moved outwardly of the casing 112 and plate 254 as shown in Fig. 13, thereby axially moving the tubular element 230 outwardly of said casing. In order to provide for the relative rotation of the plate 262 relative to the plate 254 there is provided an operating handle 116 having an elongated slot 272, said slot being adapted for the reception of the radially projecting post 274 fixed to the plate 262 (see Figs. 13 and 15). The post 274 is provided with a rotatable bearing sleeve 276 to minimize the friction between the post 274 and the slot 272. It will therefore be seen that on the rotation of the operating handle 116 the plate 262 will be concomitantly rotated thereby axially displacing the tubular element 230 relative to the gear box 24. The plate 262 is provided with a circular groove 278 which is adapted for the reception of one end of a compression spring 280, the other end of said compression spring being adapted to bear against the inner face 282 of the operating handle 116, thereby biasing said operating handle in an outward position relative to the gear box 24 or to the left as viewed in Fig. 13. From the above it will be seen that the spring 280 is effective to bias the plates 262 and 254 towards each other so that in the relaxed position of the operating handle 116 the tubular element 230 will be in the position shown in Fig. 12 in which the gear train will be free for rotation. It will therefore require a deliberate movement of the operating handle 116 for the rotation thereof and the consequent locking of the gear train and retraction of any of the gears that may be in the extended position.

Secured to the operating handle 116 by any suitable means, for example, set screw 284, is a shaft 286 which in turn controls the cam plate 288 (see Figs. 8, 9 and 10). The cam plate 288 is provided with a cam slot 290 having cam slot portions A and B, the cam slot 290 being adapted for the reception of the follower element 292 which is integral with the arm 294 carrying the roller 128. The arm 294 is provided with an upwardly extending guide element 296 which is adapted to ride in the longitudinally extending slot 110 in the side plate 16 of the apparatus. Rotatably mounted relative to the guide element 296 is a roller element 298 which is adapted to co-act with the series of spaced semi-circular slots 300 in the side plate 16 of the apparatus (see Figs. 4 and 7), said slots providing an indexing arrangement for the various stations, it being understood that one slot 300 is provided for each station so that the sliding gear box may be positively indexed at any particular station. It will therefore be apparent that when the roller element 298 projects into an associated slot 300 in the apparatus, the sliding gear box 24 will be positively indexed to the station associated with the particular slot 300. In the relaxed position of the operating handle 116 the cam plate 288 will be biased in a counter clockwise direction as viewed in Figs. 8 and 9 in which the roller element 298 will be in its extended position relative to the gear box 24, and when said gear box is at a particular station said roller element will project into the associated slot 300 for that station. In order to move the sliding gear box 24 from one station to another it will therefore be necessary to retract the roller element 298 from its associated slot 300 and for this purpose the cam plate 288 and its associated follower element 292 are provided. As previously pointed out the cam slot 290 comprises portions A and B so that on the initial arc of rotation of the handle 116 and concomitantly the cam plate 288, the roller element 298 will not be retracted from its associated slot 300, but on the further rotation of the handle 116 the follower element 292 will ride in the portion B of the cam slot 290 thereby retracting the roller element 298 from its slot 300 and permitting the gear box 24 to be longitudinally moved to another station. Thus, while the cam follower element 292 is in the portion A of the slot 290, no retraction of the roller element 298 takes place whereas when the follower element 292 is in the portion B of the cam slot 290 positive retraction of the roller element 298 from its slot 300 does take place. This feature therefore provides for the positive locking of the gear train prior to the retraction of the roller element 298 from its slot 300 in that before the follower element 292 rides in the portion B of the cam slot 290 the operating handle 116 has been rotated sufficiently to lock the gear train in the manner aforedescribed. Thusly on but slight rotation of the operating handle 116 the gear train will be positively locked and on further rotation of said operating handle the roller element 298 will be retracted from its associated slot 300 thereby permitting the gear box 24 to be moved to another station. Thus before the sliding gear box 24 can be moved from one station to another, all the gears in the gear train will be positively locked in position thereby insuring the accuracy of the mechanical curve-aligning calculations. It will be appreciated that if the gears 140, 142, 144 and 146 were not positively locked on the movement of the gear box 24 from one station to another on the meshing of said gears at a particular station, settings would be disturbed thereby injecting possible inaccuracies in the mechanical calculations of the apparatus.

When the gear box 24 is positioned at any particular station with the roller element 298 extending into the slot 300 of the paricular station, the gears 140, 142, 144 and 146 of the gear box 24 are adapted to be engaged with their associated gears on the apparatus when the gears of the gear box are in their extended position. Thus when the gear box 24 is at a particular station and the control knobs 118 and 120 are in position "2" in which the gears 140, 142, 144 and 146 are extended, the gears 140, 142, 144 will be in mesh with an associated series of three gears 54 and the gear 146 will be in mesh with an associated gear 86 in the revolution counter gear train, as shown in Fig. 13. As shown in Fig. 12, in the retracted position of the gears 140, 142, 144 and 146 they will be out of engagement with their associated gears on the apparatus whereas on the extension of any one of the gears 140, 142, 144 and 146 they will be in mesh with their respective associated gears rotatably mounted on the apparatus. As previously pointed out above, whenever the sliding gear box 24 is locked at a particular station, the extension and retraction of the gears 140, 142, 144 and 146 is under the control of the control knobs 118 and 120, said control knobs being operative to effect the extension and therefore the engagement of the gears 140, 142, 144 and 146 with their associated gears on the apparatus. It will be understood that the sliding gear box may be moved to any of the stations in any desired sequence on the rotation of the operating handle 116 and the consequent retraction of the roller element 298 from engagement with one of the associated slots 300.

In order to prevent the sliding gear box 24 from being engaged and locked at a particular station, there is provided a locking tab 302 for each station, as best shown in Figs. 3, 4, 6 and 7. The locking tabs 302 are each provided with a shaft 304 which has an end portion 306 which is adapted to project into its associated slot 300 in the locked position of the locking tab 302, as clearly shown in Fig. 6. Thus when the locking tab 302 is moved to the locking position as shown in Fig. 6, the portion 306 of the shaft 304 prevents the entry into the slot 300 of the roller element 298 of the arm 294 thereby preventing the unlocking of the gear train at the particular station. Thus as long as the portion 306 of the shaft 304 projects into its associated slot 300, the control box 24 cannot be indexed and unlocked at that particular station thereby preventing the direct actuation of the gears at that particular station. Each of the locking tabs 302 is provided with a spring clip element 308 which is adapted to coact with the longitudinal member 310 secured to the side plate 16 of the apparatus. In the unlocked position of the locking tab 302, as shown in Fig. 3, portion 312 of the spring clip element 308 abuts the chamfer 314 of the longitudinal member 310 thereby releasably retaining the locking tab 302 in the unlocked position. In the unlocked position of the tab 302, washer element 316 prevents the complete removal of said locking tab from its associated aperture 318. In the locked position of the locking tab 302 as shown in Fig. 6, the portion 320 of the spring clip element 308 abuts the chamfer 322 of the longitudinal member 310 thereby releasably retaining the locking tab 302 in its locked position. It will be readily understood that the side plate 16 of the apparatus is provided with a series of spaced apertures 318, one of said apertures being provided for each locking tab 302 and consequently for each station. Thusly, in the operation of the apparatus where at the particular station the physical needs prohibit throws or displacements of the railway track, it is only necessary to project the locking tab 302 to the locking position thereby locking and making the station a "no throw" station. Thus if for any reason it is desired to make a station a "no throw" station it is only necessary to place the locking tab 302 into its locked position in which it will be impossible to directly actuate the gears of the sliding gear box 24 and therefore effect the direct displacement of the associated pointer at the "no throw" station.

*Operation*

In the operation of the apparatus, the revolution counters 78 for each of the stations are reset to zero or starting position and for this purpose the sliding gear box 24 is locked to the station under consideration by means of the cooperative relationship between the roller element 298 of the arm 294 and the associated slot 300. The revolution counter control knob 118 is rotated to position "2" as shown in Fig. 19, in which the revolution counter 78 for the station under consideration is operatively connected to the operating crank 92. Thus, with the control knob 118 so positioned, it is merely necessary to manually rotate the operating crank 92 until a zero reading is indicated through the window 21 for the revolution counter at the station under consideration. This step is repeated for each of the stations whereby all the revolution counters 78 will be reset to the zero or starting position. Similarly, the indicator control knob 120 of the sliding gear box 24 will be rotated to position "1," as shown in Fig. 20, in which the gear train associated with the gear 142 will be operatively connected to the crank 92 whereby the ordinate for the particular station may be set. It will be evident that the operating crank 92 is manually rotated until the pointer 58 indicates the ordinate to be set on the associated scale 62 which is observed through its window 25 in the top 14 of the apparatus. Thus, each of the station ordinates are set in a similar manner and for which the sliding gear box 24 is longitudinally moved from station to station. It will be observed that in setting the ordinates for each of the stations, only the gear train associated with the gear 142 is in mesh so that the adjacent gears 140 and 144 will have no effect on the adjacent indicator elements 56. In other words, the station pointer 58 under consideration will be the only pointer that is moved by the operating crank 92 with the knob 120 in position "1" and no effect on the adjacent pointers will result. The positions of the pointers 58 will now form a graph of ordinates which is a true representation of the curve in track. It will be evident that only 32 stations can be considered at one time in the preferred embodiment of the apparatus, and for long curves the octagonal drum 68 can be rotated by means of the knob 70 whereby a new series of station numbers is indicated through the window 23 in the top 14 of the apparatus. If desired, a permanent record of the existing curve can be made by pulling the tracing paper T across the top 14 of the apparatus and tracing the line between the pointers. After this tracing is performed, the paper T may be removed for the subsequent operation of smoothing out the curve. If at any station on the curve the physical situation calls for "no throw," the pointer 58 for that station is locked by pushing the associated locking tab 302 to the locked position in which the pointer at the "no throw" station will move only as an effect of a "throw" at an adjacent station and not as a direct "throw." Since the fundamental law at the foundation of the apparatus is that all curves represented by a smooth diagram of ordinates are in best alignment, the next step is to smooth out the station ordinates until the desired solution is reached. This is accomplished by setting the sliding gear box 24 to the various stations and rotating the control knobs 118 and 120 to the position indicated in Fig. 21 in which the gears 140, 142, 144 and 146 are all in their extended position and in mesh with their associated gears on the apparatus. At the various stations the operator will rotate the operating crank 92 and adjust the pointers 58 until the desired solution is reached, it being understood that the pointer for the particular station at which the gear box is set will move to the right or left depending on the direction of movement of the crank 92. The adjacent pointers will move in the opposite direction at half the rate of speed as the center station pointer as previously pointed out, and at the same time the "throws" or displacements for the station at which the gear box is set will appear in the window 21 of the associated revolution counter. By continued adjustment of the curve, a smooth line of ordinates will be obtained. The amount of "throw" or displacement of the track that is required at the particular station in accordance with the corrected diagram will be read directly from the associated counter 78, it being understood that the "throws" from the counters for each station will indicate both positive and negative "throws," positive "throws" indicating one direction and negative "throws" indicating the opposite direction. Thus, for example, if a counter has a maximum reading of 10,000, a positive "throw" of "15" will be read simply as "0015" whereas a negative "throw" of "15" will appear on the counter as "9985," as will be readily apparent. If desired, a record of the revised curve in the manner aforedescribed may be made on the tracing paper T. Thereafter, the apparatus is reset to its zero or starting position in the manner aforedescribed, whereby the apparatus may be used to compute a new curve or work the remainder of the curve having more than 32 stations. As pointed out above, when the remainder of a curve having more than 32 stations is to be computed, the knob 70 is rotated until the next face 76 of the octagonal drum 68 comes into alignment with their associated windows 23.

It is to be noted that each of the pointers 58 which indicates the chord height for its associated station, in the course of the above described operation, undergoes two types of displacement when the control knob 120 is in position "2" in which the series of three gears 140, 142 and 144 are in mesh with their associated gears secured to the threaded rods 48:

A. A direct displacement equal to the chord height adjustment imparted to each pointer by the direct rotation of the crank 92; and B. Indirect displacements equal to one-half of the above mentioned direct displacements due to the direct operation of the adjacent pointers.

However, the final displacement that is to be given at each station under consideration is only the algebraic sum of the direct displacements of the pointer corresponding to the station, the indirect displacements being merely an effect of the pointer at an adjacent station.

It will be readily apparent that the apparatus may be constructed with any number of stations, as desired. It will thus be seen that the above described apparatus calculates string-lining mechanically in a highly improved manner. The above described apparatus determines and records the solution for the restoration of the track to proper alignment with the smallest average "throw" or "displacement." The above described curve aligning apparatus is compact and portable and provides the solution for curve alignment problems quickly, accurately, economically and with a minimum of skill. The aforedescribed locking tabs 302 at each of the stations provide for the locking of the pointers at any selected station where the physical needs prohibit "throws" or displacements of the railway track. The instant curve aligning apparatus provides improved means for the setting and adjustment of the ordinates and for the actuation of the "throw" indicators. The octagonal drum 68 provides improved station indicator means and provides for the mechanical string alignment calculation of railway curves of very great length. The "security" means of the apparatus, described in detail above, insures the accuracy of the mechanical string-line calculations by locking the entire train of gears in the sliding gear box before the sliding gear box can be moved from one station to another. The above described apparatus is particularly well adapted for the calculation of new tracks, and the like, and permits the solution of special problems, for example causing the track to pass through a particular point or giving it predetermined limitations at a certain point. Thus the above described apparatus provides an extremely accurate mechanical device for setting the diagram of a railway track curve by setting a measured chord height at the various stations and making it possible to quickly obtain, without calculation, the corresponding displacements at the stations, in accordance with the adjusted curve diagram.

While there is shown and described herein certain specific structure embodying the invention, it will be manifest to those skilled in the art that various modifications and rearrangements of the parts may be made without departing from the spirit and scope of the underlying inventive concept and that the same is not limited to the particular form herein shown and described except insofar as indicated by the scope of the appended claims.

Having thus described my invention, what I claim and desire to secure by Letters Patent, is:

1. Apparatus for the alignment of curves comprising a casing, a plurality of threaded rods journalled in said casing, a plurality of indicator elements threaded complementary to said threaded rods and guided to be movable with a translatory motion parallel to said rods on the rotation of said rods, each of said indicator elements having a pointer, a graduated scale along the path of each pointer, and means for setting and adjusting said pointers, said means comprising a gear box adapted to be slidably moved from station to station along a fixed path disposed transversely of said rods, said gear box having means adapted to rotate each of said rods independently for setting its associated pointer and to rotate each group of three consecutive rods with the middle one of said three rods being rotated in one direction and the two other rods being rotated in the opposite direction and through an angle equal to one-half of the angle of rotation of said middle one for adjusting its associated pointers, and means providing for the slidable movement of said gear means along said fixed path.

2. Apparatus for the alignment of curves comprising a casing, a plurality of threaded rods journalled in said casing, a plurality of indicator elements threaded complementary to said threaded rods and guided to be movable with a translatory motion parallel to said rods on the rotation of said rods, each of said indicator elements having a pointer, a graduated scale along the path of each pointer, and means for setting and adjusting said pointers, said means comprising a gear box adapted to be slidably moved from station to station, said gear box having means adapted to rotate each of said rods independently for setting its associated pointer and to rotate each group of three consecutive rods with the middle one of said three rods being rotated in one direction and the two other rods being rotated in the opposite direction and through an angle equal to one-half of the angle of rotation of said middle one for adjusting its associated pointers, said casing having longitudinal guideways at one side thereof, a plurality of spaced slots adjacent to one of said guideways, one slot being provided for each station, and said gear box having a plurality of rollers complementary to said guideways and a roller element adapted to be received in said spaced slots whereby said gear box is adapted to be slidably moved from station to station longitudinally of said casing and be positively indexed at each of said stations.

3. Apparatus for the alignment of curves comprising a casing, a plurality of threaded rods journalled in said casing, each of said threaded rods having an end portion extending outside of said casing at one side thereof and being provided with a gear fixed thereto, a plurality of indicator elements threaded complementary to said threaded rods and guided to be movable with a translatory motion parallel to said rods on the rotation thereof, each of said indicator elements having a pointer, a graduated scale along the path of each pointer, and means for setting and adjusting said pointers, said means comprising a gear box adapted to be slidably moved from station to station, said gear box having means adapted to rotate each of said rods independently for setting its associated pointer and to rotate each group of three consecutive rods with the middle one of said three rods being rotated in one direction and the two other rods being rotated in the opposite direction and through an angle equal to one-half of the angle of rotation of said middle one for adjusting said associated pointers, said sliding gear box means comprising three aligned projecting gears at one side thereof which are adapted to be meshed with said gears fixed to said rods for the rotation thereof.

4. Apparatus for the alignment of curves comprising a casing, a plurality of threaded rods journalled in said casing, each of said threaded rods having an end portion extending outside of said casing at one side thereof and being provided with a gear fixed thereto, a plurality of indicator elements threaded complementary to said threaded rods and guided to be movable with a translatory motion parallel to said rods on the rotation thereof, each of said indicator elements having a pointer, a graduated scale along the path of each pointer, and means for setting and adjusting said pointers, said means comprising a gear box adapted to be slidably moved from station to station, said gear box having means adapted to rotate each of said rods independently for setting its associated pointer and to rotate each group of three consecutive rods with the middle one of said three rods being rotated in one direction and the two other rods being rotated in the opposite direction and through an angle equal to one-half of the angle of rotation of said middle one for adjusting said associated pointers, said sliding gear box means comprising three aligned projecting gears at one side thereof, the center gear of said projecting gears being adapted to be meshed with said gears fixed to said rods whereby to rotate each of said rods independently for setting its associated pointer, and said three projecting gears being adapted to be meshed with the three gears fixed to each group of three consecutive rods to rotate said group of three rods for adjusting their associated pointers.

5. Apparatus for the alignment of curves comprising a casing, a plurality of threaded rods journalled in said casing, each of said threaded rods having an end portion extending outside of said casing at one side thereof and being provided with a gear fixed thereto, a plurality of indicator elements threaded complementary to said threaded rods and guided to be movable with a translatory motion parallel to said rods on the rotation thereof, each of said indicator elements having a pointer, a graduated scale along the path of each pointer, and means for setting and adjusting said pointers, said means comprising a gear box adapted to be slidably moved from station to station, said gear box having means adapted to rotate each of said rods independently for settting its associated pointer and to rotate each group of three consecutive rods with the middle one of said three rods being rotated in one direction and the two other rods being rotated in the opposite direction and through an angle equal to one-half of the angle of rotation of said middle one for adjusting said associated pointers, said sliding gear box means comprising three aligned projecting gears at one side thereof, the center gear of said projecting gears being adapted to be meshed with said gears fixed to said rods whereby to rotate each of said rods independently for setting its associated pointer, and said three projecting gears being adapted to be meshed with the three gears fixed to each group of three consecutive rods to rotate said group of three rods for adjusting their associated pointers, and means for extending and retracting said center gear independently of the other of said projecting gears for meshing said center gear with one of said gears fixed to said rods for independently setting its associated pointer.

6. Apparatus for the alignment of curves comprising a casing, a plurality of threaded rods journalled in said casing, each of said threaded rods having an end portion extending outside of said casing at one side thereof and being provided with a gear fixed thereto, a plurality of indicator elements threaded complementary to said threaded rods and guided to be movable with a translatory motion parallel to said rods on the rotation thereof, each of said indicator elements having a pointer, a graduated scale along the path of each pointer, and means for setting and adjusting said pointers, said means comprising a gear box adapted to be slidably moved from station to station, said gear box having means adapted to rotate each of said rods independently for setting its associated pointer and to rotate each group of three consecutive rods with the middle one of said three rods being rotated in one direction and the two other rods being rotated in the opposite direction and through an angle equal to one-half of the angle of rotation of said middle one for adjusting said associated pointers, said sliding gear box means comprising three aligned projecting gears at one side thereof, the center gear of said projecting gears being adapted to be meshed with said gears fixed to said rods whereby to rotate each of said rods independently for setting its associated pointer, and said three projecting gears being adapted to be meshed with the three gears fixed to each group of three consecutive rods to rotate said group of three rods for adjusting their associated pointers, and means for extending and retracting said center gear independently of the other of said projecting gears for meshing said center gear with one of said gears fixed to said rods for independently setting its associated pointer, said latter means further controlling the extension and retraction of said three projecting gears as a group for meshing said gears with the three gears fixed to each group of three consecutive rods for adjusting their associated pointers, said latter means having a first position in which all three projecting gears are retracted and accordingly out of mesh with said gears fixed to said rods, a second position in which said center gear only is extended and accordingly in mesh with an associated gear fixed to one of said rods, and a third position in which all three projecting gears are extended and accordingly in mesh with a group of three associated gears fixed to a group of three consecutive rods.

7. Apparatus for the alignment of curves comprising a casing, a plurality of threaded rods journalled in said casing, each of said threaded rods having an end portion extending outside of said casing at one side thereof and being provided with a gear fixed thereto, a plurality of indicator elements threaded complementary to said threaded rods and guided to be movable with a translatory motion parallel to said rods on the rotation thereof, each of said indicator elements having a pointer, a graduated scale along the path of each pointer, and means for setting and adjusting said pointers, said means comprising a gear box adapted to be slidably moved from station to station, said gear box having means adapted to rotate each of said rods independently for setting its associated pointer and to rotate each group of three consecutive rods with the middle one of said three rods being rotated in one direction and the two other rods being rotated in the opposite direction and through an angle equal to one-half of the angle of rotation of said middle one for adjusting said associated pointers, said sliding gear box means comprising three aligned projecting gears at one side thereof and a fourth projecting gear positioned above said three aligned gears, and counting means having an actuating gear positioned outside of said casing and immediately above said gears fixed to said rods, said counting means being associated with each of said rods for indicating the algebraic sum of the rotations imparted thereto when it constitutes the center rod of said group of three consecutive rods and said fourth projecting gear is in mesh with the actuating gear associated with said center rod.

8. Apparatus for the alignment of curves comprising a casing, a plurality of threaded rods journalled in said casing, each of said threaded rods having an end portion extending outside of said casing at one side thereof and being provided with a gear fixed thereto, a plurality of indicator elements threaded complementary to said threaded rods and guided to be movable with a translatory motion parallel to said rods on the rotation thereof, each of said indicator elements having a pointer, a graduated scale along the path of each pointer, and means for setting and adjusting said pointers, said means comprising a gear box adapted to be slidably moved from station to station, said gear box having means adapted to rotate each of said rods independently for setting its associated pointer and to rotate each group of three consecutive rods with the middle one of said three rods being rotated in one direction and the two other rods being rotated in the opposite direction and through an angle equal to one-half of the angle of rotation of said middle one for adjusting said associated pointers, said sliding gear box means comprising three aligned projecting gears at one side thereof and a fourth projecting gear positioned above said three aligned gears, and counting means having an actuating gear positioned outside of said casing and immediately above said gears fixed to said rods, said counting means being associated with each of said rods for indicating the algebraic sum of the rotations imparted thereto when it constitutes the center rod of said group of three consecutive rods and said fourth projecting gear is in mesh with the actuating gear associated with center rod, and means for extending and retracting said fourth projecting gear independently of the other of said projecting gears for meshing said fourth gear with one of said actuating gears.

9. Apparatus for the alignment of curves comprising a casing, a plurality of threaded rods journalled in said casing, each of said threaded rods having an end portion extending outside of said casing at one side thereof and being provided with a gear fixed thereto, a plurality of indicator elements threaded complementary to said threaded rods and guided to be movable with a translatory motion parallel to said rods on the rotation thereof, each of said indicator elements having a pointer, a graduated scale along the path of each pointer, and means for setting and adjusting said pointers, said means comprising a gear box adapted to be slidably moved from station to station, said gear box having means adapted to rotate each of said rods independently for setting its associated pointer and to rotate each group of three consecutive rods with the middle one of said three rods being rotated in one direction and the two other rods being rotated in the opposite direction and through an angle equal to one-half of the angle of rotation of said middle one for adjusting said associated pointers, said sliding gear box means comprising three aligned projecting gears at one side thereof and a fourth projecting gear positioned above said three aligned gears, and counting means having an actuating gear positioned outside of said casing and immediately above said gears fixed to said rods, said counting means being associated with each of said rods for indicating the algebraic sum of the rotations imparted thereto when it constitutes the center rod of said group of three consecutive rods and said fourth projecting gear is in mesh with the actuating gear associated with said center rod, said casing having longitudinal guideways at one side thereof, a plurality of spaced slots adjacent to one of said guideways, one slot being provided for each station, and said gear box having a plurality of rollers complementary to said guideways and a roller element adapted to be received in said spaced slots whereby said gear box is adapted to be slidably moved from station to station longitudinally of said casing and be positively indexed at each of said stations, said gear box having a rotatable operating handle for retracting said roller element from its associated slot and a provision for locking said projecting gears against rotation when said roller element is retracted from its associated slot.

10. Apparatus for the alignment of curves comprising a casing, a plurality of threaded rods journalled in said casing, each of said threaded rods having an end portion extending outside of said casing at one side thereof and being provided with a gear fixed thereto, a plurality of indicator elements threaded complementary to said threaded rods and guided to be movable with a translatory motion parallel to said rods on the rotation thereof, each of said indicator elements having a pointer, a graduated scale along the path of each pointer, and means for setting and adjusting said pointers, said means comprising a gear box adapted to be slidably moved from station to station, said gear box having means adapted to rotate each of said rods independently for setting its associated pointer and to rotate each group of three consecutive rods with the middle one of said three rods being rotated in one direction and the two other rods being rotated in the opposite direction and through an angle equal to one-half of the angle of rotation of said middle one for adjusting said associated pointers, said sliding gear box means comprising three aligned projecting gears at one side thereof and a fourth projecting gear positioned above said three aligned gears, and counting means having an actuating gear positioned outside of said casing and immediately above said gears fixed to said rods, said counting means being associated with each of said rods for indicating the algebraic sum of the rotations imparted thereto when it constitutes the center rod of said group of three consecutive rods and said fourth projecting gear is in mesh with the actuating gear associated with said center rod, means for indexing said gear box at each of said stations, and a provision for locking said projecting gears against rotation when said gear box is released from being indexed at a station.

11. Apparatus for the alignment of curves comprising a casing, a plurality of threaded rods journalled in said casing, a plurality of indicator elements threaded complementary to said threaded rods and guided to be movable with a translatory motion parallel to said rods on the rotation of said rods, each of said indicator elements having a pointer, a graduated scale along the path of each pointer, and means for setting and adjusting said pointers, said means comprising a gear box adapted to be slidably moved from station to station, said gear box having means adapted to rotate each of said rods independently for setting its associated pointer and to rotate each group of three consecutive rods with the middle one of said three rods being rotated in one direction and the two other rods being rotated in the opposite direction and through an angle equal to one-half of the angle of rotation of said middle one for adjusting its associated pointers, said casing having longitudinal guideways at one side thereof, a plurality of spaced slots adjacent to one of said guideways, one slot being provided for each station, said gear box having a plurality of rollers complementary to said guideways and a roller element adapted to be received in said spaced slots whereby said gear box is adapted to be slidably moved from station to station longitudinally of said casing and be positively indexed at each of said stations, and locking means associated with each of said slots which projects into said slots whereby to prevent the indexing of said gear box at the station in which said portion projects.

12. Apparatus for the alignment of curves comprising a casing, a plurality of threaded rods journalled in said casing, a plurality of indicator elements threaded complementary to said threaded rods and guided to be movable with a translatory motion parallel to said rods on the rotation of said rods, each of said indicator elements having a pointer, a graduated scale along the path of each pointer, and means for setting and adjusting said pointers, said means comprising a gear box adapted to be slidably moved from station to station, said gear box having means adapted to rotate each of said rods independently for setting its associated pointer and to rotate each group of three consecutive rods with the middle one of said three rods being rotated in one direction and the two other rods being rotated in the opposite direction and through an angle equal to one-half of the angle of rotation of said middle one for adjusting its associated pointers, said casing being provided with station indicator means to indicate the station corresponding to each pointer and associated graduated scale, said station indicator means comprising a rotatable drum having a plurality of adjacent faces, each of said faces having a series of markings to indicate corresponding stations, said drum being manually rotatable whereby any preselected face may be used to indicate stations.

13. Apparatus for the alignment of curves, comprising a plurality of stations, a plurality of mechanical means associated with the respective stations and bodily movable along fixed paths for indicating chord heights at said stations, respectively, and means for bodily moving said mechanical means for the adjustment thereof comprising gear means movable relative to said stations along a fixed path extending transversely of said first mentioned fixed paths from station to station, said gear means being engageable with said mechanical means for the bodily movement thereof for the setting and adjustment of said mechanical means at its associated station, means providing for the movement of said gear means along said transverse fixed path, and manually operable means associated with said gear means for controlling the engagement with, and disengagement from, said gear means of said mechanical means.

14. Apparatus for the alignment of curves, comprising a casing having a plurality of stations, a plurality of bodily movable mechanical means associated with the respective stations for indicating chord heights at said stations, respectively, and means for bodily moving said mechanical means for the adjustment thereof comprising means movable relative to said casing along a fixed path from station to station, said last mentioned means being operative for setting and adjusting said mechanical means at its associated station and having provision to set said mechanical indicating means to predetermined values and to adjust said indicating means imparting a direct displacement to one of said indicating means at the station and to impart indirect displacements of an amount equal to one-half of said direct displacement and in an opposite direction thereto to the two indicating means disposed on either side of said first mentioned indicating means, and immediately adjacent thereto, and means providing for the movement of said bodily moving means relative to said casing along said fixed path.

15. Apparatus for the alignment of curves, comprising a casing having a plurality of stations, a plurality of mechanical means associated with the respective stations and bodily movable along fixed paths for indicating chord heights at said stations, respectively, and means for bodily moving said mechanical means for the adjustment thereof comprising gear means movable relative to said casing along a fixed path extending transversely of said first mentioned fixed paths from station to station, said gear means being engageable with said mechanical means for the bodily movement thereof for the setting and adjustment of said mechanical means at its associated station and having provision to set said mechanical indicating means to predetermined values and to adjust said indicating means imparting a direct displacement to one of said indicating means at the station and to impart indirect displacements of an amount equal to one-half of said direct displacement and in an opposite direction thereto to the two indicating means disposed on either side of said first mentioned indicating means, and immediately adjacent thereto, means providing for the movement of said gear means relative to said casing along said transverse fixed path, and means for controlling the engagement with, and disengagement from, said gear means of said mechanical means.

16. Apparatus for the alignment of curves, comprising a casing having a plurality of stations, a plurality of mechanical means associated with the respective stations and bodily movable along fixed paths for indicating chord heights at said stations, respectively, and means for bodily moving said mechanical means for the adjustment thereof comprising gear means movable relative to said casing along a fixed path extending transversely of said first mentioned fixed paths from station to station, said gear means being engageable with said mechanical means for the bodily movement thereof for the setting and adjustment of said mechanical means at its associated station and having provision to set said mechanical indicating means imparting a direct displacement to one of said indicating means at the station and to impart indirect displacements of an amount equal to one-half of said direct displacement and in an opposite direction thereto to the two indicating means disposed on either side of said first mentioned indicating means, and immediately adjacent thereto, means providing for the movement of said gear means relative to said casing along said transverse fixed path, counting means for registering the algebraic sum of the direct displacements imparted to each of said mechanical means, and means for indexing said gear means along said transverse fixed path at any preselected station.

References Cited in the file of this patent

UNITED STATES PATENTS

| | | |
|---|---|---|
| 2,056,490 | Skaraas et al. | Oct. 6, 1936 |
| 2,485,810 | Bienfait | Oct. 25, 1949 |
| 2,600,144 | Watson | June 10, 1952 |

FOREIGN PATENTS

| | | |
|---|---|---|
| 205,516 | Germany | Jan. 4, 1909 |